Sept. 15, 1942.   C. I. HALL   2,296,031
VOLTAGE REGULATING APPARATUS
Filed May 7, 1941
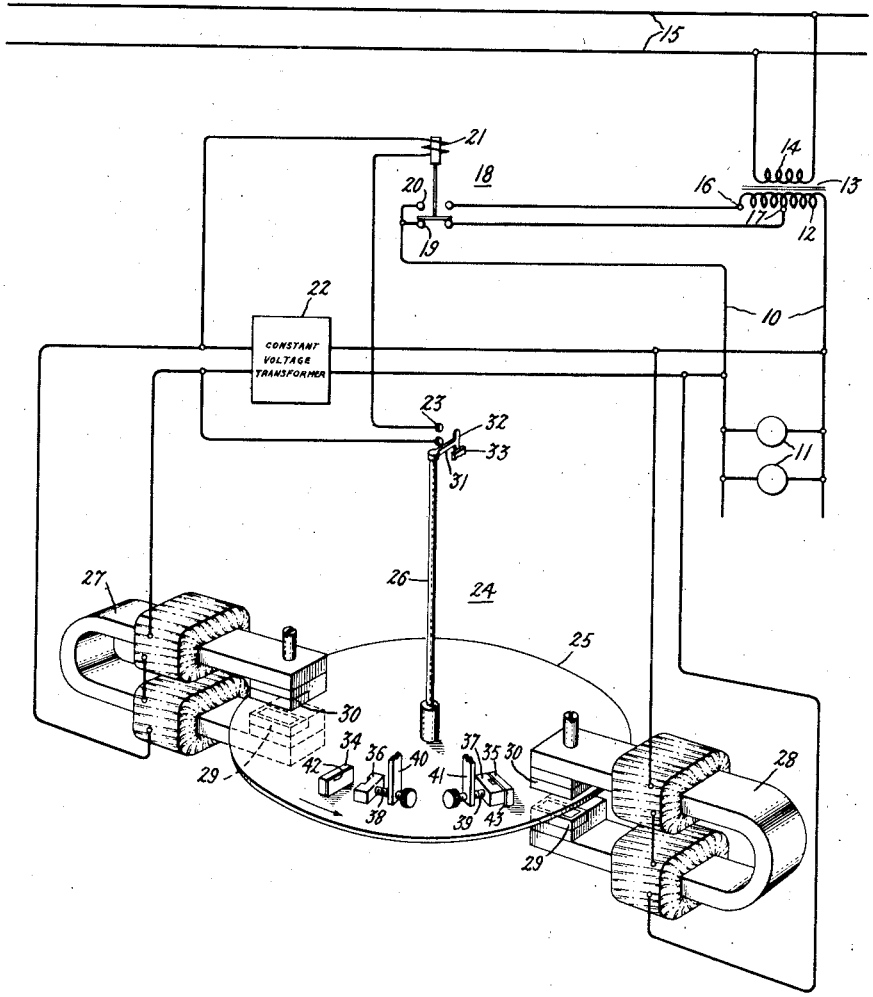
Inventor:
Chester I. Hall,
by *Harry E. Dunham*
His Attorney.

Patented Sept. 15, 1942

2,296,031

UNITED STATES PATENT OFFICE 2,296,031

VOLTAGE REGULATING APPARATUS

Chester I. Hall, Rexford, N. Y., assignor to General Electric Company, a corporation of New York Application May 7, 1941, Serial No. 392,301

6 Claims. (Cl. 171—119)

My invention relates to electrical voltage regulating apparatus and more particularly to apparatus for controlling a voltage regulator of the transformer tap changing type although its use is not necessarily limited to this type of regulator.

Alternating current load circuits, particularly low voltage distribution circuits, are frequently connected to be energized from a step-down distribution transformer and in order to maintain the voltage of the load circuit within predetermined limits with changes in load it is common to provide line voltage responsive switching apparatus for connecting the load circuit to different voltage taps on the secondary winding of the distribution transformer. Such apparatus is generally located in an isolated and exposed position, such as on a distribution line pole, and it is therefore desirable that it be reliable in operation, simple and rugged in construction and also that its operation be substantially unaffected by the wide changes in ambient temperature to which it is subjected.

An object of my invention is to provide new and improved voltage regulating apparatus.

It is a further object of my invention to provide improved voltage regulating apparatus which is simple and rugged in construction and which can be easily adjusted to obtain the desired operating characteristics.

Another object of my invention is to provide voltage regulating apparatus whose operation is substantially unaffected by large fluctuations in ambient temperature.

The novel features which I believe to be characteristic of my invention are set forth with particularity in the appended claims. The invention itself, however, both as to its organization and method of operation together with further objects and advantages thereof will best be understood with reference to the following description taken in connection with the accompanying drawing in which the single figure is a diagrammatic illustration of an embodiment of my invention in a voltage regulating system for an alternating current circuit utilizing a tap changing transformer type of regulator.

Referring to the drawing I have shown an alternating current load circuit 10 connected to supply load devices 11. The load circuit 10, which may for example be a distribution circuit, is connected to be energized from the secondary winding 12 of a suitable distribution step-down transformer 13 having a primary winding 14 connected to the feeder circuit 15. For the purpose of varying the line voltage, the load circuit 10 is arranged to be selectively connected to the high and low voltage taps 16 and 17 of the transformer secondary winding 12 by means of a tap changing contactor 18. The tap changing contactor 18 is provided with a pair of normally closed contacts 19 and a pair of normally open contacts 20 and the circuit connections are such that when the contactor is in the normal or de-energized position the load circuit 10 is connected to the low voltage tap 17 through the contacts 19 and when the contactor is in the energized position the load circuit 10 is connected to the high voltage tap 16 through the contacts 20. The tap changing contactor 18 has an operating coil 21 which may be connected to be energized from any suitable source. For convenience I have shown the operating coil 21 as energized from the secondary winding of a constant voltage transformer 22 having its primary winding connected to the load circuit 10, this constant voltage transformer being utilized in connection with the operation of the remainder of my regulating apparatus as will be described below. Connected in series with the operating coil 21 of the tap changing contactor 18 are control contacts 23 of a voltage responsive device indicated generally at 24 which will now be described.

The voltage responsive device 24 comprises an induction motive device having a disk armature member 25 of conducting material which is secured to a rotatably mounted shaft 26 and adapted to rotate in the air gaps of two U-shaped shaded pole electromagnets 27 and 28. The electromagnets 27 and 28 each have a fixed shading pole 29 and an adjustable shading pole 30. These shading poles are so arranged that the torques produced by the two electromagnets tend to rotate the armature disk 25 in opposite directions. The energizing coils of the electromagnet 27 are connected to the secondary winding of the constant voltage transformer 22 so that the current in the energizing coils and consequently the torque produced by the electromagnet remains substantially constant. The constant voltage transformer 22 may be of any suitable type, such devices being well known in the art. For example, a transformer with a highly saturated core will act to give substantially constant voltage on the secondary winding with variations in primary voltage above the value required for core saturation.

The energizing coils of the electromagnet 28 are connected directly across the load circuit 10 so that the current in the coils and consequently the torque produced by the electromagnet varies in accordance with the line voltage.

The adjustable poles 30 of the electromagnets 27 and 28 are adjusted so that the torques produced by the electromagnets are equal and opposite when the voltage in load circuit 10 is at the predetermined value to be maintained. Hence when the voltage of the load circuit 10 deviates below this predetermined value the torque produced by the electromagnet 27 predominates and the disk armature 25 tends to rotate in a direction indicated by the arrow. However, when the line voltage deviates above the predetermined value the torque produced by the electromagnet 28 predominates and the disk tends to rotate in the opposite direction.

Attached to the shaft 26 is an arm 31 carrying a bridging member 32. When the disk 25 rotates to the high voltage or voltage decreasing position, the member 32 is adapted to engage a stop member 33. However, when the disk 25 rotates to the low voltage or voltage increasing position the member 32 is adapted to bridge the control contacts 23 to cause energization of the tap changing contactor 18.

In order to provide means for varying the amount of unbalance torque required to cause the disk armature 25 to rotate from the high voltage to low voltage position and vice versa I provide adjustable biasing means in the form of permanent magnets. The magnetic biasing means comprise armature members 34 and 35 secured to the disk armature 25. The armatures 34 and 35 are adapted to move in attractive relation with permanent magnets 36 and 37 carried by thumb screw members 38 and 39 which are mounted in threaded engagement with fixed supporting members 40 and 41. The permanent magnets 36 and 37 are secured to the thumb screws 38 and 39 by friction swivel connections (not shown) so that by adjustment of the thumb screws the air gaps between the magnets and their cooperating armatures may be adjusted. Shims 42 and 43 of a non-magnetic material such as brass are attached to the faces of the armatures 34 and 35 to prevent sticking between the armatures and their associated magnets. The armatures 34 and 35 are so located on the disk 25 that the permanent magnet 36 acts to bias the armature disk 25 in the low voltage position while the permanent magnet 37 acts to bias the armature 25 in the high voltage position. By adjusting the thumb screws 38 and 39 the amount of bias in each position may be adjusted.

In operation, let it be assumed that the voltage of the load circuit 10 is at a desired value to be maintained and that the poles 30 are adjusted so that the torques produced by the electromagnets 27 and 28 are equal and opposite. Let it also be assumed that the disk armature 25 is in the high voltage position, as indicated in the drawing, so that the permanent magnet 37 attracts its armature 35 and acts to bias the disk armature 25 to a position where the member 32 engages the stop 33. Now suppose the voltage of the load circuit 10 begins to fall due to an increase in load so that the torque produced by the electromagnet 28 decreases and the resultant torque produced by the magnets 27 and 28 tends to rotate the disk armature 25 toward the low voltage or voltage increasing position. When the voltage of the load circuit 10 falls to a point where the resultant torque is sufficient to overcome the biasing force of the permanent magnet 37, the disk 25 rotates to the low voltage position where member 32 closes contacts 23. This causes energization of the tap changing contactor 18 so that the load circuit 10 is connected to the high voltage tap 16 and its voltage is therefore increased. The movement of the disk armature 25 to the low voltage position causes the armature 34 to move into attractive relation with the permanent magnet 36 and provide a biasing force for maintaining the disk armature in this position.

If now, due to a decreased load on the load circuit 10, its voltage rises above the predetermined value to be maintained, the torque produced by the electromagnet 28 exceeds the torque produced by the magnet 27 so that the resultant torque tends to rotate the disk armature back to the low voltage position. If the voltage of the load circuit 10 rises to a point where the resultant torque is sufficient to overcome the biasing force of the permanent magnet 36, the disk armature 25 rotates back to the low voltage position so that contacts 23 are opened, tap changing contactor 18 is deenergized and the load circuit is reconnected to the low voltage tap 17, whereby the voltage of the load circuit is decreased.

From the foregoing it will be apparent that the voltage responsive device 24 will act to maintain the voltage of the load circuit 10 within predetermined limits by automatically controlling the operation of the tap changing contactor 18. The adjustable permanent magnets 36 and 37 provide very convenient means for adjusting the voltage deviations from normal required to cause the movement of the voltage responsive device to the voltage increasing and voltage decreasing positions respectively so that any desired operating characteristic can be obtained. Also, by adjusting the pole pieces 30 of the electromagnets 27 and 28 the voltage maintained by the regulating apparatus may be conveniently varied.

Thus it will be seen that I have provided voltage regulating apparatus which is simple and rugged in construction and with a minimum of friction since there is only one moving part. Furthermore, since the electromagnets 27 and 28 provide opposed torques acting on the same moving system there is automatic compensation for ambient temperature changes which will affect both electromagnets equally and therefore will not act to vary the regulator setting.

Although I have illustrated my improved voltage responsive apparatus used in connection with a transformer tap changing type of regulator, it will be understood that it may be used to control any suitable voltage adjusting apparatus without departing from my invention in its broader aspects.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a voltage regulating system, an alternating current load circuit, means for controlling the voltage of said circuit, an induction motive device for controlling said first mentioned means comprising a conducting member rotatable in one direction to a voltage increasing position and in the opposite direction to a voltage decreasing position, a pair of shaded pole electromagnets associated with said conducting member for producing torques tending to rotate said member in opposite directions, means for energizing one of said electromagnets from said circuit so that it produces a substantially constant torque, means for energizing the other of said electromagnets from said circuit so that it produces a torque variable in accordance with the voltage of said circuit, the opposing torques produced by said electromagnets being equal when the voltage of said circuit is at a predetermined value to be maintained but becoming unbalanced upon a deviation of said voltage from said value to cause rotation of said member either to the voltage increasing or the voltage decreasing position depending on the direction of said deviation, means for biasing said conducting member in both the voltage increasing and voltage decreasing positions and means for adjusting said biasing means whereby to vary the amount of unbalance torque required to move said conducting member from one to the other of said positions.

2. In a voltage regulating system, an alternating current load circuit, a transformer for energizing said circuit, said transformer having high and low voltage tap connections, switching means for selectively connecting said circuit to said high and low voltage tap connections, an induction motive device for controlling said switching means comprising a conducting member rotatable in one direction to a voltage increasing position and in the opposite direction to a voltage decreasing position, a pair of shaded pole electromagnets associated with said conducting member for producing torques tending to rotate said member in opposite directions, the resistances of said electromagnets and consequently the current therethrough and the torques produced thereby being similarly variable with changes in ambient temperature, a constant voltage transformer having its primary winding connected to said circuit and its secondary winding connected to energize one of said electromagnets, the other of said electromagnets being connected to be energized in accordance with the voltage of said circuit whereby a resultant torque is produced tending to rotate said member to the voltage increasing or voltage decreasing position depending on whether the voltage of said circuit is above or below a predetermined value, said value being substantially unaffected by variations in ambient temperature.

3. In a voltage regulating system, an alternating current circuit, means for controlling the voltage of said circuit, an induction motive device comprising a rotatable member for controlling said first mentioned means, said member being rotatable in one direction to a voltage increasing position and in the other direction to a voltage decreasing position, a pair of shaded pole electromagnets associated with said rotatable member and arranged to produce torques tending to move said member in opposite directions, said electromagnets being connected to be energized from said alternating current circuit, the resistances of said electromagnets and consequently the current therethrough and the torques produced thereby being similarly variable with changes in ambient temperature and means for causing the relative values of the torques produced by said electromagnets to vary with the voltage of said alternating current circuit, said torques being unbalanced in a direction to cause said rotatable member to rotate to a voltage decreasing position when said voltage is above a predetermined value and unbalanced in the opposite direction to cause rotation of said rotatable member to the voltage increasing position when said voltage is below said predetermined value, said torques being balanced when said voltage is at said predetermined value, said value being substantially unaffected by variations in ambient temperature.

4. In a voltage regulating system, an alternating current circuit, means for controlling the voltage of said circuit, an induction motive device comprising a conducting member for controlling said first mentioned means, said member being rotatable in one direction to a voltage increasing position and in the opposite direction to a voltage decreasing position, a pair of shaded pole electromagnets associated with said member and arranged to produce torques tending to rotate said member in opposite directions, the resistances of said electromagnets and consequently the current therethrough and the torques produced thereby being similarly variable with changes in ambient temperature, a source of constant alternating voltage, one of said electromagnets being energized from said source of constant voltage and the other of said electromagnets being energized in accordance with the voltage of said circuit whereby a resultant torque is produced tending to rotate said member to the voltage increasing or voltage decreasing position depending on whether the voltage of said circuit is above or below a predetermined value, said value being substantially unaffected by variations in ambient temperature.

5. In a voltage regulating system, an alternating current circuit, means for controlling the voltage of said circuit, an induction motive device comprising a conducting member for controlling said first mentioned means, said member being rotatable in one direction to a voltage increasing position and in the opposite direction to a voltage decreasing position, a pair of shaded pole electromagnets associated with said member and arranged to produce torques tending to rotate said member in opposite directions, the resistances of said electromagnets and consequently the current therethrough and the torques produced thereby being similarly variable with changes in ambient temperature, a constant voltage transformer having its primary winding connected to said circuit and its secondary winding connected to energize one of said electromagnets, the other of said electromagnets being connected to be energized in accordance with the voltage of said circuit whereby a resultant torque is produced tending to rotate said member to the voltage increasing or voltage decreasing position depending on whether the voltage of said circuit is above or below a predetermined value, said value being substantially unaffected by variations in ambient temperature.

6. In a voltage regulating system, an electric circuit, means for controlling the voltage of said circuit, an induction motive device comprising a rotatable conducting member for controlling said first mentioned means, said member being rotatable in one direction to a voltage increasing position and in the opposite direction to a voltage decreasing position, means comprising a shaded pole electromagnet for producing a constant torque tending to rotate said member in one direction, means comprising a second shaded pole electromagnet for producing a torque variable in accordance with the voltage of said circuit and tending to rotate said member in the opposite direction whereby a resultant torque is produced tending to rotate said member to the voltage increasing or voltage decreasing position depending on whether the voltage of said circuit is above a predetermined value, means for biasing said rotatable member in both the voltage increasing and voltage decreasing positions, and means for adjusting said biasing means.

CHESTER I. HALL.